DIRECTIONAL ACOUSTIC TRANSMITTING AND RECEIVING APPARATUS
Filed Sept. 6, 1968 5 Sheets-Sheet 1
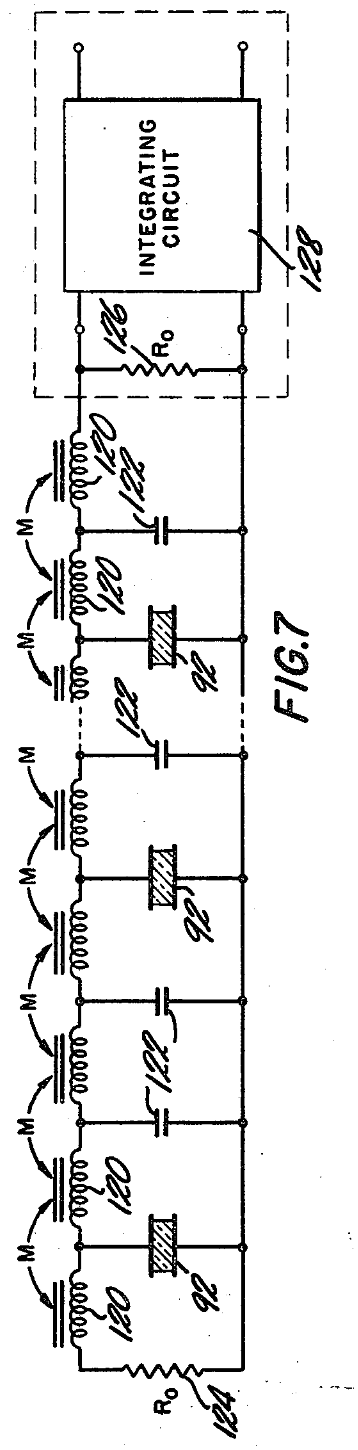
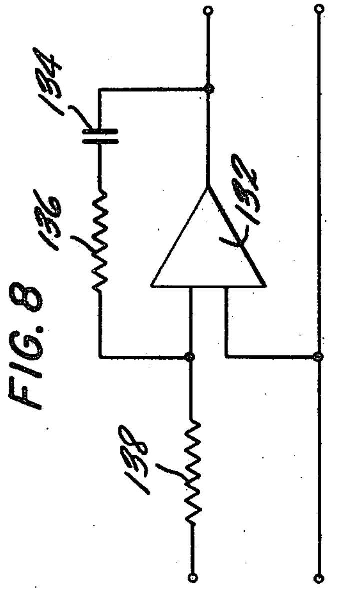
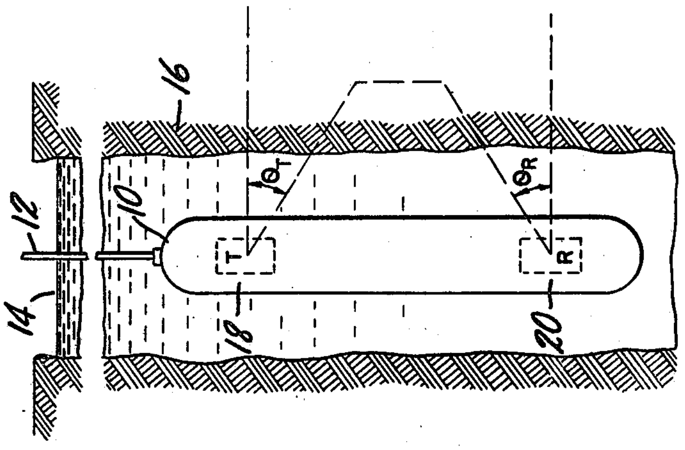
FIG. 1
INVENTOR.
ADELBERT SEMMELINK
BY
Brumbaugh, Free, Graves & Donohue
his ATTORNEYS INVENTOR.
ADELBERT SEMMELINK
BY
Brumbaugh, Free, Graves & Donohue
his ATTORNEYS INVENTOR.
ADELBERT SEMMELINK
BY
Brumbaugh, Free, Graves & Donohue
his ATTORNEYS Feb. 17, 1970 A. SEMMELINK 3,496,533

DIRECTIONAL ACOUSTIC TRANSMITTING AND RECEIVING APPARATUS

Filed Sept. 6, 1968 5 Sheets-Sheet 4

INVENTOR.
ADELBERT SEMMELINK

BY Brumbaugh, Free, Graves & Donohue his ATTORNEYS

DIRECTIONAL ACOUSTIC TRANSMITTING AND RECEIVING APPARATUS

Filed Sept. 6, 1968 5 Sheets-Sheet 5

INVENTOR.
ADELBERT SEMMELINK
BY
Brumbaugh, Graves, Donohue & Raymond
his ATTORNEYS

1

3,496,533

DIRECTIONAL ACOUSTIC TRANSMITTING AND RECEIVING APPARATUS

Adelbert Semmelink, Chicago, Ill., assignor to Schlumberger Technology Corporation, Houston, Tex., a corporation of Texas Continuation-in-part of application Ser. No. 492,054, Oct. 1, 1965. This application Sept. 6, 1968, Ser. No. 767,026
Int. Cl. G01v *1/16, 1/00;* G10k *11/00*
U.S. Cl. 340—17 20 Claims

ABSTRACT OF THE DISCLOSURE

An acoustic transmitting and receiving system for well logging is described, the transmitter and receiver having correlated directional characteristics which may be electrically controlled to permit steering. Each of the transmitter and receiver comprises a plurality of electroacoustic transducer elements incorporated in an electrical delay line, whereby the energy conversion proceeds successively from element to element at a rate which determines the steering angle. The transmitter produces a relatively non-ringing acoustic pulse and the receiver has a broad-banded response, to provide an accurate representation of the effect of formations on the acoustic wave. A transmitter having magnetostrictive elements and a ceramic receiver are specifically described.

This application is a continuation-in-part of application Ser. No. 492,054 filed Oct. 1, 1965, now abandoned.

The present invention relates to acoustic well logging apparatus and more particularly to acoustic transmitting and receiving means having directional characteristics.

In general, conventional acoustic logging transmitter and receiver transducers have configurations such that the maximum amplitude components of the transmission and response characteristics are normal to the axis of the borehole in which the transducers are disposed. Consequently, in considering a simple single transmitter-single receiver logging arrangement, a substantial amount of acoustic energy from the transmitter is dissipated in the formations and never reaches the receiving transducer. It has been recognized that improved acoustic logging results can be achieved if the maximum amplitude component of the transmitted signal is inclined at an angle to the normal to the borehole axis and towards the receiver. Depending upon the angle of inclination, this may result in emphasizing the compressional wave energy impinging on the receiver or emphasizing the components of the transverse or Rayleigh wave reaching the receiver. The latter component of an acoustic signal is useful in locating fractures and voids lying generally normal to the borehole axis.

Prior art devices for directional acoustic transmission or reception, also known as "steered" transmitters and receivers, suffer from several shortcomings. They often require transducer elements of complex configurations which present manufacturing problems and are so bulky and heavy that it is difficult to adapt them for use in conventional logging tools. Moreover, no truly effective way of correlating directional transmitter and receiver transducers to achieve maximum response to desired formation characteristics has heretofore been devised.

Accordingly, it is the primary object of the present invention to provide a directional acoustic transmitting and receiving system for well logging which avoids the foregoing shortcomings of prior art directional apparatus.

A further object of the present invention is to provide

2 improved directional electroacoustic transducing apparatus which is highly compact and rugged in construction and which can be readily accommodated in existing logging equipment.

An additional object of this invention is to provide improved electroacoustic transducer means for well logging whose directional characteristics can be readily controlled.

Still another object of the present invention is to provide compatible electroacoustic transmitting and receiving means which enable more effective acoustic logging.

Briefly, in accordance with the present invention, both the transmitting and receiving trandsucer means of the directional system are comprised of a plurality of individual transducing elements longitudinally spaced from each other in the direction of the axis of the borehole in which they are to be used, and coupled to each other by means of an electrical delay line. In the case of the transmitting transducer means, the individual transducer elements preferably are short, cylindrical, magnetostrictive members whose actuating windings provide the inductances of the delay line with which they are associated. The receiver transducer elements are short, cylindrical lengths of a ceramic material, which, in addition to providing the electroacoustic properties required, supply at least a part of the shunt capacitance for the delay line associated with them. In both cases, the structural arrangements of the transducer and delay line elements are such that the overall transducer assembly is compact and rugged.

An important feature of the present invention is the ease of adjustability of the "steering" angle, or angle of directivity. In both the transmitter and receiver trandsucer means, the physically spacing between the electroacoustic elements and the electrical delay therebetween affect the directional properteis. In addition, the magnitude of the driving voltage pulse applied to the transmitter will influence the direction of the transmitter output signal. This parameter is easily adjustable from the earth's surface and imparts to the logging system of the invention a flexibility of operation not found in prior art arrangements.

Further, according to the invention, a more accurate representation of the effects of the formation on the acoustic waves transmitted therethrough is obtained by generating an acoustic pulse that is relatively non-ringing, i.e., rapidly damped, and detecting the acoustic energy with a broad-banded receiver so that substantially all of the frequency components of the acoustic signal are included in the receiver output. The non-ringing transmitted pulse and broad-banded reception are respectively provided by the transmitting and receiving transducers described herein.

The foregoing and other objects, features and advantages of the invention will become more readily apparent from the following detailed description thereof, when taken in conjunction with the accompanying drawings in which:

FIGURE 1 is a diagrammatic representation of a logging tool in a borehole indicating the transmitter and receiver positions;

FIGURE 7 is a diagram illustrating the electrical circuit of the receiving transducer of FIGURE 5;

FIGURE 8 is a circuit diagram of a form of integrating network suitable for use with the receiver of the invention.

Figure 3:
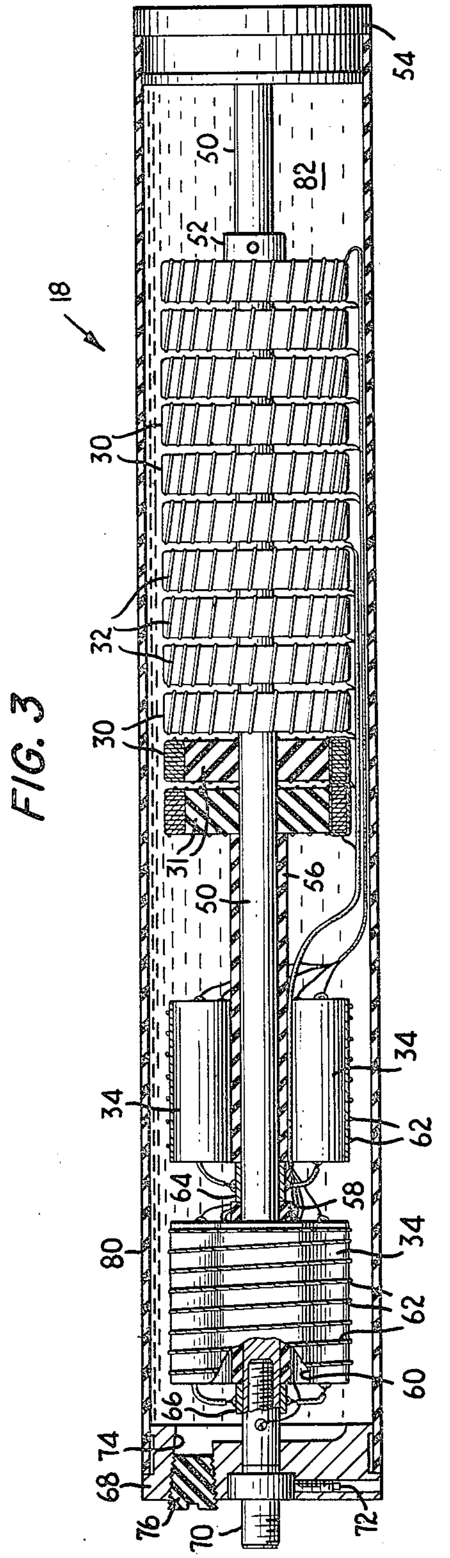
FIGURE 3 is a cross-sectional view showing an actual construction of a transmitting transducer represented in FIGURE 2.

Turning now to FIGURE 1, a typical well logging arrangement is shown. A logging tool is suspended by means of a cable 12 in a fluid-filled well bore 14 drilled in the earth formations 16. In conventional manner, the logging tool 10 is moved through the borehole 14 by means of a winch arrangement at the surface (not shown). As will be understood, the cable 12 includes all of the necessary conductors for connecting a power source to the logging tool and for coupling signals between the tool and the surface equipment.

The tool shown for illustrative purposes includes a single acoustic transmitter means 18 and a single acoustic receiver means 20, although it will be understood that the present invention is applicable to various arrangements employing plural transmitters and/or receivers.

Conventional acoustic transmitting trandsucers employed for well logging purposes emit acoustic energy in a radial pattern, with the maximum amplitude component generally normal to the borehole axis. The directional pattern of conventional receivers is similar. Accordingly, substantially less than the maximum amplitude of the emitted acoustic energy is available for the acoustic measurement. As indicated in FIGURE 1, the acoustic energy whose travel time between the transmitter and receiver is to be measured, follows a path from the transmitter T at an angle $\theta_T$ from the normal, then generally along the borehole wall and finally back to the receiver R at an angle $\theta_R$. It will be observed that if the transmitter and receiver have directional patterns such that the maximum output or response occurs at the respective angles $\theta_T$ and $\theta_R$, larger amplitude acoustic signals will be available for the masurement. It has also been found that the transverse or Rayleigh component of the acoustic wave transmitted to the formations can be emphasized by controlling the direction of transmission of energy to occur at a predetermined angle, and by adjusting the receiver to have a corresponding reception pattern. Rayleigh wave logging has been found useful in detecting cracks and fractures in formations lying in a plane generally normal to the borehole axis.

Figure 2:
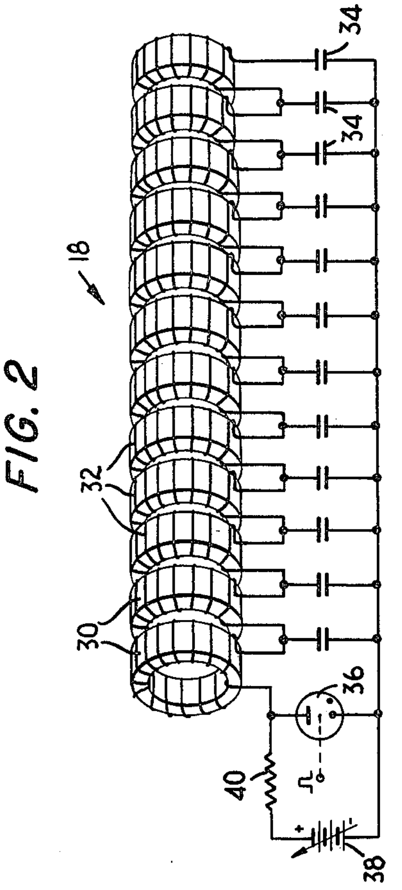
FIGURE 2 is a diagram illustrating the electrical circuitry of a transmitting transducer in accordance with the invention.

The electrical schematic representation of a directional transmitting transducer in accordance with the present invention is shown in FIGURE 2. The transducer 10 is composed of a plurality of cylindrical transducer elements 30 of relatively short axial length. The transducers are formed of a magnetostrictive material, e.g. Permendur, such as in the form of a plurality of laminations fastened together or in the form of a continuous strip coiled to form the cylindrical element. Each of the magnetostrictive elements 30 is wound with an actuating coil 32, all of the coils being connected in series as shown. A capacitor 34 is connected between one terminal of each of the coils 32 and a reference potential. The series coils 32 in conjunction with the shunt connected capacitors 34 form an electrical delay line.

Preferably, the elements 30 are arranged in pairs, with the respective coils 32 wound in opposite directions around the elements, to minimize external magnetic fields.

The actuating impulse for the transmitter is obtained from a suitable pulse generator means at the surface and is applied as a triggering pulse to a switching device 36, such as a cold cathode thyratron identified as the Bendix type TD–28. The triggering pulse is applied to the grid of the switching device 36 and plate voltage is obtained from a variable D.C. source 38 through a charging resistor 40.

With the switching tube 36 non-conducting, all of the capacitors 34 are charged to the same voltage, i.e., the voltage of the source 38. When the switch 36 is closed, the capacitor nearest to it starts to discharge through the actuating coil on the first transducer element. At this moment, the voltage across that actuating coil is equal to the applied D.C. voltage and the voltage across all of the other coils is zero. The voltage across the capacitor falls slowly at first and then reverses sign. At the moment of reversal of the voltage across the capacitor, the voltage across the second actuating coil increases rapidly, causing the second capacitor to discharge through the second coil. The foregoing operation repeats itself for each coil-capacitor pair in the device and each time a capacitor discharges through its associated coil, the magnetostrictive element coupled to the coil emits a pulse of acoustic energy.

The summation of the individual acoustic outputs of the transducer elements 30 is the effective output of the overall transducer. Each of the transducer elements 30 has an essentially omnidirectional radiating pattern, but the spacing between successive elements and the time delay between their energization results in the reinforcement of a particular angular component. This produces a resultant acoustic signal having a principal component at a predetermined angle. Variation of the angle may be obtained by (1) varying the physical distance between adjacent transducer elements, or (2) varying the electrical delay provided between adjacent elements. In accordance with the invention, the latter may be readily obtained by variation of the capacitor charging voltage provided by the direct current source 38. This may be readily implemented, such as by a potentiometer control on the surface equipment, thereby making it unnecessary to vary the physical spacing of the transducer elements or to change the values of the capacitors 34 to establish a desired directivity. Thus a single transducer constructed in accordance with the invention is usable over a range of angles merely by adjustment of the applied D.C. voltage. A particular wave may be emphasized by adjusting the magnitude of the voltage source 38 to provide a time delay between adjacent transducer elements which corresponds to the velocity in the formation of the wave which is to be emphasized.

A suitable physical construction for the transmitting transducer of FIGURE 2 is illustrated in FIGURE 3. An elongated cylindrical member 50 supports the various elements of the transducer. Each of the transducer elements 30 has its center filled with rubber or similar resilient material 31 except for a central bore through which the support member 50 passes. The diameters of the member 50 and the bore in the resilient filling of the transducer elements are such that the transducer elements are snugly mounted on the member. Although for ease of illustration all of the interconnections of the windings 32 have not been shown in FIGURE 1 it will be understood that these windings are interconnected in the manner shown in FIGURE 2.

Near the lower end of the support member 50, the right-hand end as viewed in the drawings, a collar 52 is mounted, such as by a set screw, to firmly locate the end transducer element on the member 50. A cylindrical end plate 54 is threadedly secured to the end of the member 50 to provide a sealing means for one end of the transducer arrangement. The end plate may be made of plastic or metal, as desired.

Along the support member 50 adjacent the other end of the transducer array is provided a pair of sleeves 56 and 58 of rubber or other suitably resilient insulating material. The sleeves form a mounting surface against which the capacitors 34 are fastened. In the embodiment shown, the capacitors are generally cylindrical in form and are held fast to the sleeves 56 and 58 by means of an elastic wrapper 60 and bindings 62.

Between the rubber sleeves 56 and 58 is a conductive ring 64 in electrical contact with the support member 50. A similar conductive ring 66 is connected to the member 50 above the upper bank of capacitors. The conductive rings 64 and 66, together with the support rod 50 provide a reference potential surface, e.g. ground, to which one terminal of each of the capacitors 34 is connected. The conductors from the coils 32 are brought down along the transducer array and connected to the respective capacitors in the manner indicated in FIGURE 2.

A second end plate 68 is provided at the upper end of the transducer unit. Through a central aperture in the end plate 68, an electrical connecting device 70 is inserted, threadedly fastened at its lower end to the end of the support member 50. The upper end of the connector 70 is suitably threaded for coupling the cable connected to the switching circuitry, i.e., switch 36, voltage source 38, etc. The connector 70 is rigidly secured in the end plate 68 by means of a set screw 72.

At a point below the end plate 68, a conductor extends through an aperture in the connector 70 to a terminal of the coil 32 on the first transducer element of the array. This completes the electrical connections within the transducer unit.

The entire transducer unit is enclosed within a fluid-tight outer casing 80 of a suitable elastomeric material which is capable of withstanding the temperature and pressure conditions encountered in boreholes, as well as resisting the attacks of the various substances to which it is exposed. The casing 80 is secured to the end plates 54 and 68 to make fluid-tight seals therewith.

The entire chamber formed by the end plates 54 and 68, and the casing 80, is filled with an oil 82 to provide pressure equalization for the transducer. The chamber is filled through a port 74 provided in the end plate 68 which is normally kept closed by means of a stopper 76.

As will be recognized, the complete transducer is in the form of a cylinder having a diameter slightly greater than that of the individual elements. An actual transducer built in accordance with the invention may have an overall length of less than 2 feet and employ individual transducer elements having an axial length of approximately ½ inch and an outside diameter of about 2¾ inches, thereby being readily accommodated in existing logging tools.

As discussed hereinabove, steering or variation of the angle at which the maximum amplitude component of the transmitted acoustic wave occurs, can be accomplished by varying one or more of several parameters of the transducer. The physical spacing of the transducer elements and the delay between excitation of the respective elements both have a strong influence on its directional properties. Therefore, different physical arrangements of the transducer elements 30 in the unit of FIGURE 3, i.e., the spacing of the units 30 along the support member 50, can provide different transmitters with different directional characteristics. Also the value of the capacitors 34 in construction of FIGURE 3 may be changed to vary the delay between transducer elements and provide the desired directional characteristics.

Figure 4A:
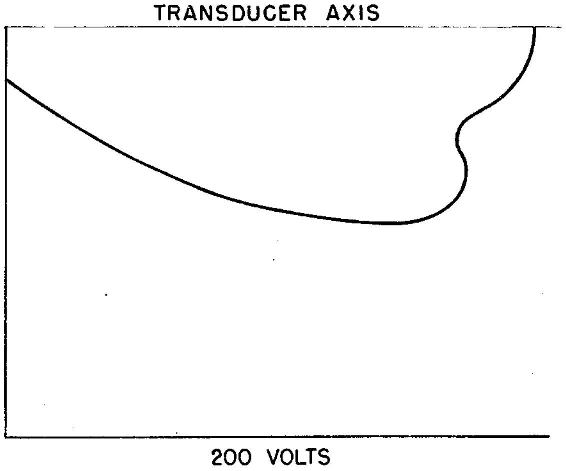
FIGURES 4A, 4B and 4C are diagrams illustrating the directional patterns obtainable with the transmitting transducer means of FIGURES 2 and 3.
Figure 4B:
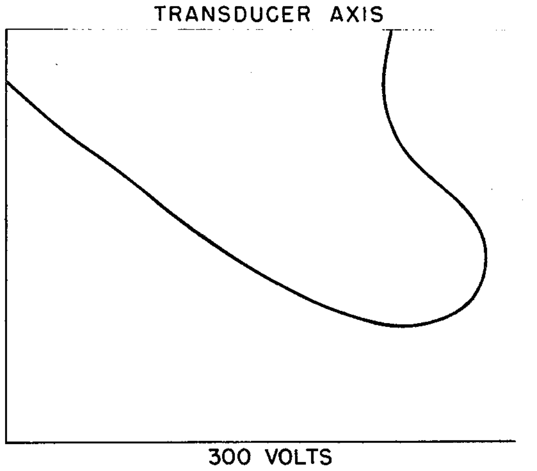
Figure 4C:
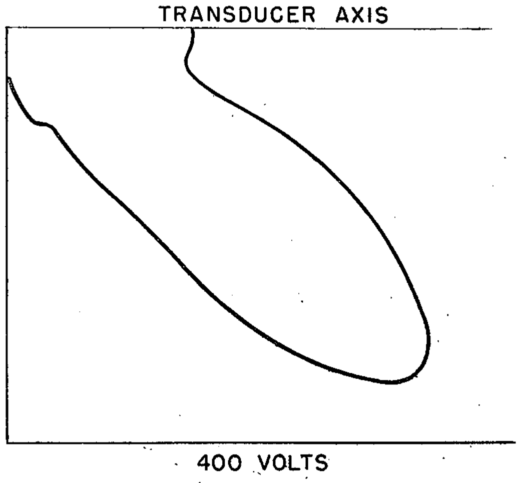

However, the most convenient way in which to alter the directivity pattern of the transmitting transducer of the invention is to vary the applied voltage, as described in connection with FIGURE 2. By this means, a single transducer unit is capable of much wider logging application without requiring modification of the transducer itself. The effect of voltage variation on the directional pattern developed by the transducer of the type shown in FIGURES 2 and 3 as illustrated in FIGURES 4A, 4B and 4C. Each of the three charts indicates the directional pattern of the same transducer for a different applied voltage. As seen, the angle of the maximum transmitted component with respect to the transducer axis (and consequently the borehole axis) increases as the applied voltage increases. Thus, by adjusting the magnitude of the source 38 (FIGURE 2) different angles may be obtained.

Figure 9A:
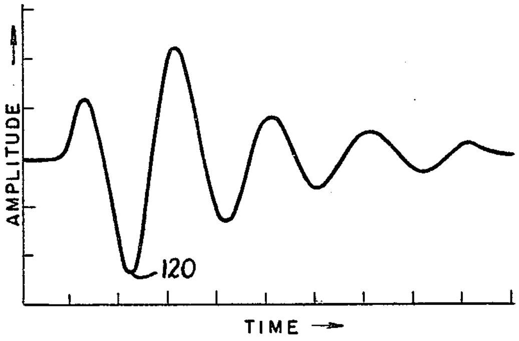
FIGURES 9A through 9E are waveform and frequency distribution diagrams illustrating the characteristics of conventional devices and those of the present invention.
Figure 9B:
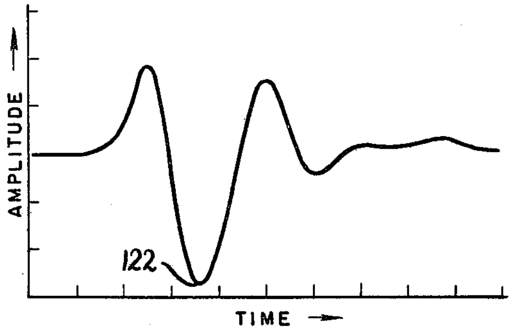

An acoustic transmitter of the type described above produces an acoustic output impulse upon actuation that is relatively non-ringing. This is illustrated by FIGURES 9A and 9B, which show the acoustic waveforms generated by a conventional, single-element magnetostrictive transmitter and the transmitter of the present invention, respectively. Upon application of the electrical driving pulse, the conventional transmitter relatively quickly builds to its maximum acoustic pressure as indicated at 120, FIGURE 9A, and then gradually damps down, the damping extending over an appreciable number of half-cycles. The continued vibration of the transducer after its peak amplitude is referred to as "ringing," and is analagous to the ringing of a resonant electrical circuit.

In contrast to the conventional transmitter, the transmitter of the present invention produces an output pulse that is relatively non-ringing, as illustrated in FIGURE 9B. As shown therein, the acoustic pressure wave is very quickly damped after reaching its peak amplitude at 122, there being only one half-cycle of appreciable amplitude after the peak, as compared to the five or more of FIGURE 9A.

Figure 9C:
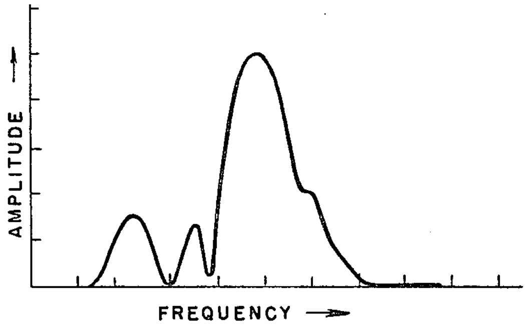
Figure 9D:
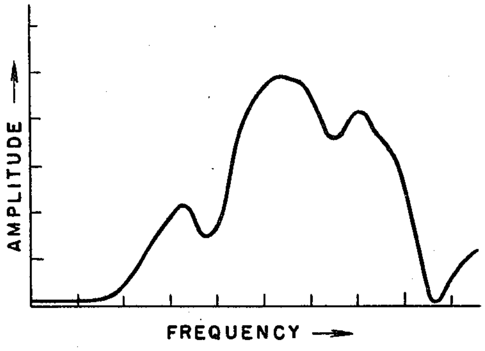

The difference in character between ringing and non-ringing acoustic pulses is seen from a comparison of FIGURES 9C and 9D, which indicate respectively the frequency spectra of the two types of pulses. It is apparent therefrom that the non-ringing pulse (of FIGURE 9B) contains a substantially wider range of frequency components of significant amplitudes (FIGURE 9D) than the ringing pulse whose frequency distribution falls off rapidly on either side of its principal component (FIGURE 9C). When such a non-ringing pulse passes through earth formations, its various frequency components are selectively attenuated by the different formation materials, to provide at the receiver a signal more accurately indicative of the nature of the formations.

In the transmitter of FIGURES 2 and 3, a non-ringing pulse is produced by the interaction of the electrical delay line and the magnetostrictive elements. Because of the action of the delay line, the duration of the magnetic excitation of each element is shorter than in conventional transmitters. The non-ringing characteristic is further emphasized by using thin wall transducer elements.

For best reception of the non-ringing acoustic pulses described above, a receiver having a wide band frequency response is required. A receiver in accordance with the invention having both suitable directive properties and wide band response is illustrated in FIGURES 5 to 8.

Figure 5:
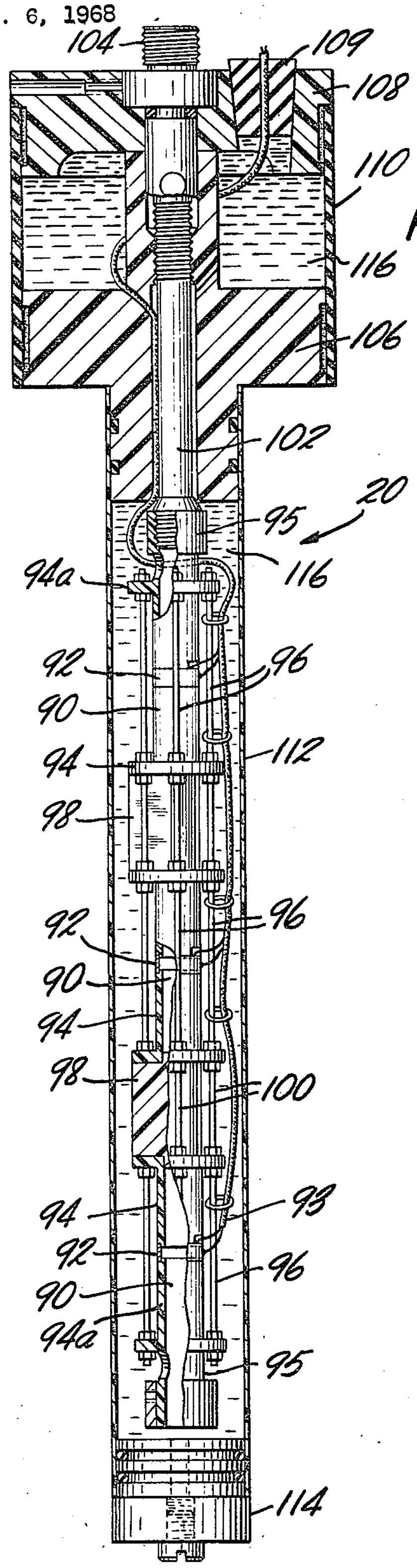
FIGURE 5 is a partial cross-section of a receiving transducer assembly in accordance with the invention.
Figure 6:
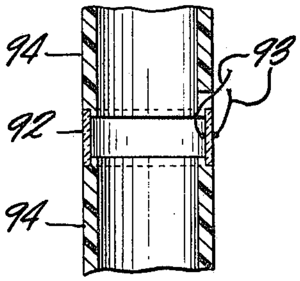
FIGURE 6 is an enlarged view of a portion of FIGURE 5 showing the mounting of the transducer elements.

The physical construction of a receiver suitable for use with the above-described transmitter is shown in FIGURE 5. The unit is comprised of any suitable number of transducer sections 90, e.g. 3 as shown, each of which includes a ceramic transducer element 92. The annular transducer elements 92, which preferably are formed of a ceramic material, such as lead titanate zirconate, capable of providing an electrical output in response to acoustic energy impinging thereon, are held between and in axial alignment with respective pairs of plastic flanged cylindrical elements 94. As seen best in FIGURE 6, the outer surfaces of the facing ends of the pairs of cylindrical elements are stepped so as to snugly receive the transducer elements 92. A suitable cement may be used to firmly bond the element 92 to the supporting cylindrical elements.

Each transducer subassembly, consisting of the transducer element 92 and the pair of flanged cylindrical elements 94, is held together in structurally rigid fashion, by a plurality of elongated tie rods 96 which are threaded at each end and suitably bolted through corresponding holes in the flanges of the elements 94. Thus, each transducer subassembly is a substantially rigid tube.

Proper spacing of the transducer elements to achieve the desired directivity characteristic is obtained by means of spacer elements 98 inserted between each successive pair of transducer sections. The spacers 98 may be of any suitable form cut to the desired length and rigidly secured between the flanged ends of the respective cylindrical elements 94, such as by the tie rods 100. For example, the cross section of the elements 98 may have three radially extending vanes angular displaced from each other by 120°. It is sufficient only that these spacers be of the proper length, have sufficient structural rigidity to withstand the mounting stresses, and be of a material, e.g. plastic, that does not disturb the acoustic properties of the assembled unit.

The cylindrical elements **94*a* at either end of the assembled transducer structure have extensions 95 which provide a mounting means for the transducer assembly. As shown in the drawing, the upper extension 95 is suitably threaded to engage the support rod 102 in the upper end of the device which, through suitable fittings, is coupled to a threaded connection 104. The latter secures the transducer unit to the logging tool. The support rod 102 is encased by a pair of plastic spacer elements 106 and 108 which in turn are sealed within a rubber boot or covering 110**.

The transducer structure itself is sealed within a plastic housing 112 secured to the lower end of the spacer 106 in fluid-tight engagement (such as by the O-rings shown) and closed at its other end by a plug member 114. The interior of the sleeve 112, including the hollow interior of the transducer arrangement, and the hollow space within the boot 110 is filled with a suitable oil to provide pressure equalization. The stopper 109 in the upper spacer 108 allows for filling of the interior of the structure with the oil.

In a typical assembly, the transducer elements 92 were ½ inch in diameter, had an axial length of ¼ inch, and were spaced 3 inches apart. For best response, the transducer elements preferably have a resonant frequency higher than the maximum acoustic frequency to be supplied by the transmitter.

To provide the necessary electrical connections, each of the ceramic elements 92 is silver plated on both its interior and exterior surfaces and a pair of conductors 93 (FIGURE 6) soldered one on either surface. The conductors are brought out from each of the transducer elements as a twisted pair, all of which are then combined to form a cable which may be tied to the rods 96 as shown in FIGURE 5. The cable is brought out through the spacers 106 and a suitable opening in the stopper 109 for connection to the remaining circuitry in the logging tool.

FIGURE 7 is an electrical diagram of a receiver embodying the structure of FIGURE 5. As will be seen, the receiver components form a delay line of the M-derived type with the ceramic transducer elements 92 providing certain of the shunt capacitances at spaced points along the line. The basic delay line may be comprised of series-connected ferrite or iron cored inductances 120, mutually coupled as indicated, and shunt capacitances 122. Where necessary to obtain proper capacitance values, the transducer elements 92 may be combined, in series or parallel, with additional capacitor elements (not shown). The line is terminated at either end by resistive impedances 124, 126 equal to the characteristic impedance of the line.

The directional characteristics of the receiver are determined by the physical spacing between the transducer elements 92 and the electrical delay between successive transducer elements. As indicated in FIGURE 7, each of the transducer elements 92 is electrically separated from its next element by one or more delay line sections which provide the desired electrical delay. The physical spacing between the elements 92 is established by their location in the structure, as determined by the size of the elements 94 and 98 (FIGURE 5).

Since ceramic transducer elements of the type described have a relatively low capacitance, and therefore high impedance, a direct connection to an input of a delay line would present problems. The present construction avoids this by utilizing the ceramic elements as the capacitances of the delay line at appropriately spaced points along its electrical length, thereby doing away with impedance matching problems.

The characteristics of the delay line shown are such as to introduce some distortion into the electrical waveform of the delay line output, as compared with the acoustic pressure impinging on the transducer elements. To minimize this distortion and create a true electrical representation of the acoustic pressure, an integrating circuit 128 is provided at the output of the delay line.

A preferred form of such integrating circuit 128 is shown in FIGURE 8. This is basically a feedback type of circuit in which part of the output of an amplifier 132 is fed back to its input through a compensating network consisting of capacitor 134 and resistor 136. Such integrating networks are described in detail in "Waveforms," volume 19, M.I.T. Radiation Laboratory Series, copyright 1949, page 650. If the feedback resistor 136 and the input resistor 138 are made equal to $R_0$, the characteristic impedance of the delay line, the resistance 138 will serve as the terminating impedance for the line and the resistor 126 (FIGURE 7) may be dispensed with.

Figure 9E:
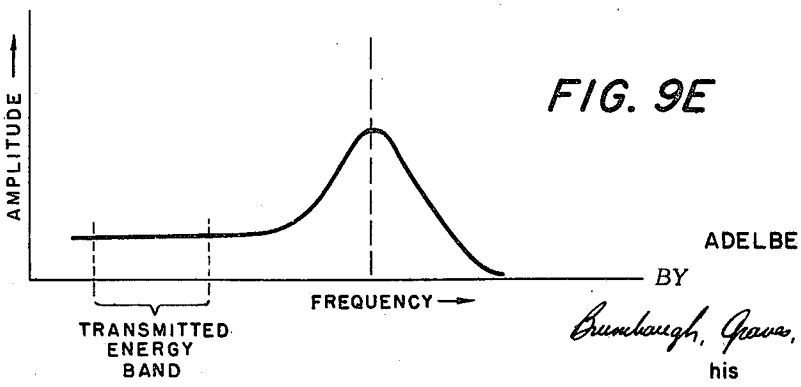

The combination of the physical arrangement of FIGURE 5 and the electrical arrangement of FIGURES 7 and 8 provide an acoustic receiving arrangement having a wide frequency band which is capable of providing an accurate representation of the acoustic pressures to which it is subjected. A typical frequency response curve for such a receiver is shown in FIGURE 9E. As shown, the receiver has a relatively narrow peak response at its nominal frequency and a rather uniform, although lesser, response above and below the resonance peak. The resonance peak of the receiver described herein occurs at approximately 80 kc.p.s., while the nominal frequency of the transmitter of FIGURES 2 and 3 is set at about 25 kc.p.s., so that the frequency distribution extends from about 15 to 40 kc.p.s. (see FIGURE 9D). It will be recognized then, that the receiver response is substantially uniform over the entire range of frequencies in the transmitted signals and its output will therefore truly reflect the frequency selective attenuation of the formation materials.

The receiver arrangement described herein has an added advantage in that because of its high resonant frequency relative to the transmitter frequency components, the latter will not induce distortion-producing resonances in the receiver. The directivity or "steering angle" of the receiver is established by the physical and electrical spacing of the transducer elements. The physical spacing is determined by the construction as indicated in FIGURE 5. The electrical spacing may be varied from the surface by providing a delay line having a relatively large number of sections and switching means, such as electromagnetic relays, for connecting the transducers 92 in at different points along the delay line. Such an arrangement can readily be controlled from the surface.

It will be realized from the foregoing that many modifications of the above-described apparatus will occur to those skilled in the art without departing from the scope of the invention. For example, the switching network illustrated in FIGURE 3 may be replaced with a semiconductor network utilizing a silicon controlled rectifier, and the particular structural arrangement of both the transmitter and receiver may be modified, such as by adding or subtracting transducer elements, within the spirit of the invention. Different forms of delay lines may be used if desired. Accordingly, the invention is to be limited only in accordance with the scope of the appended claims.

I claim:

1. Electroacoustic transducer means for use in a well bore and having a directional characteristic comprising a plurality of individual electroacoustic elements disposed in alignment along an axis, electrical delay means coupling said transducer elements to each other to provide electrical delays therebetween, the operative angle of said transducer means relative to said axis being dependent upon the physical distance and electrical delay between said transducer elements, and electrical control means for effectively adjusting the magnitude of the electrical delay between said transducer elements to vary the operative angle of said transducer means.

2. Electroacoustic transducer means for supplying acoustic impulses in a fluid-filled well bore comprising, a plurality of individual electroacoustic transducer elements disposed longitudinally of one another along an axis so as to pass through a well bore and closely spaced to one another, each of said elements capable of being separately excited by an electrical signal to emit acoustic energy, electrical delay means coupling said transducer elements to each other to transmit an electrical signal applied to an end one of said plurality of elements to the remainder of said elements in succession with a predetermined delay between each pair of successive elements, means for applying an electrical signal to said end one of said elements, and means for adjusting the magnitude of said electrical signal to change the predetermined delay between each pair of successive elements, thereby to vary the angle between the maximum amplitude component of the resultant acoustic signal and said axis.

3. Electroacoustic transducer means for supplying acoustic impulses in a well bore comprising, a plurality of individual cylindrical transducer elements of magnetostrictive material disposed coaxially of each other along the length of an axis, each of said elements having an actuating coil wound thereon, said coils being connected to one another in series, capacitor means coupled between the common connection of each adjacent pair of said coils and reference potential, said coils and capacitor means constituting an electrical delay line for transmitting an electrical signal therealong to said transducers in succession with a predetermined delay between each pair of successive elements, means for applying an electrical signal to the free terminal of the coil on an end one of said transducer elements, and means for adjusting the amplitude of said electrical signal to change the predetermined delay between each pair of successive elements, thereby to vary the angle between the maximum amplitude component of the resultant acoustic signals and said axis.

4. Electroacoustic transducer means for supplying acoustic impulses in a well bore comprising, an elongated, electrically conductive support means, a plurality of individual toroidal transducer elements, electrically nonconductive elastomer means mounting said elements on said support means, an actuating coil wound on each of said transducer elements, means connecting said coils to one another in series relationship, a plurality of capacitors mounted on said support means and electrically insulated therefrom, one for each of said transducer elements, each of said capacitors being connected between a terminal of the coil on a respective transducer element and said support means, and a generally cylindrical casing enclosing said entire structure in fluid-tight manner.

5. Electroacoustic transducer means for supplying acoustic impulses in a well bore comprising, an elongated support member, a plurality of individual cylindrical transducer elements of greater diameter than said support member, resilient spacer means mounted on said support member for carrying said transducer elements in coaxial relationship therewith, each of said elements having an actuating coil wound thereon, means connecting said coils to one another in series relationship, a plurality of capacitors mounted on said support member, one for each of said transducer elements, each of said capacitors being connected between a terminal of the coil on a respective transducer element and a reference potential surface, and a generally cylindrical casing enclosing said entire structure in fluid-tight manner.

6. Electroacoustic transducer means according to claim 5, further comprising an oil filling said casing.

7. Electroacoustic transducer means for receiving acoustic impulses transmitted in a well bore comprising, an electrical delay line including a plurality of series inductances and a plurality of shunt capacitances, at least one of said capacitances being of a material responsive to acoustic energy to generate an electrical signal, integrating means coupled across the output of said delay line to compensate for distortion of said electrical signal induced by said delay line, thereby to produce a substantially true electrical representation of the acoustic pressure impinging on said transducer means.

8. Electroacoustic transducer means for directionally receiving acoustic impulses transmitted in a well bore comprising, an electrical delay line including a plurality of series inductances and a plurality of shunt capacitances, selected ones of said capacitances at spaced locations along said line being of a material responsive to acoustic energy to generate an electrical signal, integrating means coupled across the output of said delay line to compensate for distortion of said electrical signal induced by said delay line, thereby to produce a substantially true electrical representation of the acoustic pressure impinging on said transducer means.

9. Electroacoustic transducer means for directionally receiving acoustic impulses transmitted in a well bore comprising, an electrical delay line including a plurality of series inductances and a plurality of shunt capacitances, selected ones of said capacitances at equally spaced locations along said line comprising a ceramic material responsive to acoustic energy to generate an electrical signal, integrating means coupled across the output of said delay line to counteract distortion of said electrical signal induced by said delay line, thereby to produce a substantially true electrical representation of the acoustic pressure impinging on said transducer means, the directivity of said transducer means being dependent upon the physical distances between said ceramic elements and the electrical delay between said ceramic elements, variation of either or both of which is effective to change the angle of directivity.

10. Electroacoustic transducer means for directionally receiving acoustic impulses transmitted in a well bore comprising, a plurality of cylindrical transducer elements of a ceramic material responsive to acoustic energy to generate an electrical signal, a pair of tubular mounting members for each of said transducer elements disposed coaxially with and at either end thereof, each of said mounting members having an annular shoulder at one end thereof to receive snugly the adjacent end of said transducer elements, means to firmly retain said transducer elements between their respective mounting members to form a plurality of rigid, tubular subassemblies, each including a transducer element, and means to join said subassemblies in coaxial, end-to-end relationship.

11. Transducer means according to claim 10 wherein spacer means are interposed between successive subassemblies to provide a predetermined spacing between respective transducer elements.

12. Transducer means according to claim 10 further including a generally cylindrical casing enclosing the assembled structure in fluid-tight manner, and an oil filling said casing.

13. Transducer means according to claim 10 wherein the other end of each of said mounting members is provided with a radially extending flange, and wherein the means to retain each of the transducer elements between its respective mounting members comprises a plurality of threaded fasteners extending between the flanges of said members.

14. A directional acoustic transmission and reception system comprising, electroacoustic transducer means for generating acoustic impulses in a well bore with a selectable angle between the maximum amplitude component of the acoustic output and the axis of said transducer means, and electroacoustic transducer means responsive to acoustic energy transmitted in a well bore at a selected angle to generate a corresponding electrical signal, each of said transmitting and receiving electroacoustic transducer means comprising a plurality of individual electroacoustic transducer elements, and electrical delay means coupling said transducer elements to each other, the operative angle of each of said transducer means being dependent upon the physical distance and electrical delay between said transducer elements, and electrical means for varying said selectable angle with respect to at least one of said transducer means.

15. A directional acoustic transmission and reception system comprising, transmitting electroacoustic transducer means for supplying substantially non-ringing acoustic impulses in a well bore with a selectable angle between the maximum amplitude component of the acoustic output and the axis of said transducer means, and receiving electroacoustic transducer means having a wide frequency band characteristic responsive to acoustic energy transmitted in a well bore at a selected angle to generate a corresponding electrical signal, each of said transmitting and receiving electroacoustic transducer means comprising a plurality of individual electroacoustic transducer elements and electrical delay means including series inductances and shunt capacitances coupling said transducer elements to each other, the operative angle of each of said transducer means being dependent upon the physical distance and electrical delay between said transducer elements.

16. A directional acoustic transmission and reception system according to claim 15 wherein said individual transducer elements of said receiving transducer means comprise cylindrical ceramic members responsive to acoustic energy to generate electrical signals, said members also providing certain of said shunt capacitances at spaced points along said delay line.

17. A directional acoustic transmission and reception system comprising, transmitting electroacoustic transducer means for supplying acoustic impulses in a well bore with a selectable angle between the maximum amplitude component of the acoustic output and the axis of said transducer means, and receiving electroacoustic transducer means responsive to acoustic energy transmitted in a well bore at a selected angle to generate a corresponding electrical signal, each of said transmitting and receiving electroacoustic transducer means comprising a plurality of individual electroacoustic transducer elements and electrical delay means including series inductances and shunt capacitances coupling said transducer elements to each other, the elements of said transmitting transducer means comprising members of magnetostrictive material magnetically coupled to respective ones of said series inductances and the elements of said receiving transducer means comprising ceramic members responsive to acoustic energy to generate electrical signals, said ceramic members also providing certain of said shunt capacitances at spaced points along said delay line.

18. A directional acoustic transmission and reception system for use in a well bore comprising, electroacoustic transducer means for supplying substantially non-ringing acoustic impulses to earth formations adjacent a borehole with a selectable angle between the maximum amplitude component of the acoustic output and the borehole axis, and electroacoustic transducer means having a wide frequency band characteristic responsive to acoustic energy transmitted through the formations at a selected angle to generate a corresponding electrical signal.

19. A directional acoustic transmission and reception system comprising, transmitting electroacoustic transducer means for supplying substantially non-ringing acoustic impulses in a well bore with a selectable angle between the maximum amplitude component of the acoustic output and the axis of said transducer means, and receiving electroacoustic transducer means having a wide frequency band characteristic responsive to acoustic energy transmitted in a well bore at a selected angle to generate a corresponding electrical signal, each of said transmitting and receiving electroacoustic transducer means comprising a plurality of individual electroacoustic transducer elements and electrical delay means including series inductances and shunt capacitances coupling said transducer elements to each other, the individual transducer elements of said transmitting transducer means comprising cylindrical members of magnetostrictive material magnetically coupled to respective series inductances of the associated delay means, the operative angle of each of said transducer means being dependent upon the physical distance and electrical delay between said transducer elements.

20. A directional acoustic transmission and reception system for use in a well bore comprising, electroacoustic transducer means for supplying substantially non-ringing acoustic impulses having a given frequency band to earth formations adjacent a bore hole with a selectable angle between the maximum amplitude component of the acoustic output and the bore hole axis, and electroacoustic transducer means having a wide frequency band characteristic with the center frequency of said band being substantially higher than the highest frequency of said non-ringing acoustic impulses, said last-named transducer means being responsive to acoustic energy transmitted through the formations at a selected angle to generate a corresponding electrical signal.

References Cited

UNITED STATES PATENTS 2,868,311 1/1959 Tullos.
3,138,219 6/1964 Blizard.

RODNEY D. BENNETT, Jr., Primary Examiner

B. L. RIBANDO, Assistant Examiner

U.S. Cl. X.R.

181—.5; 340—15.5